Nov. 24, 1959 J. H. BENSON 2,913,811
COLD EXTRUSION OF BEARING RACES
Filed Dec. 20, 1956 2 Sheets-Sheet 2
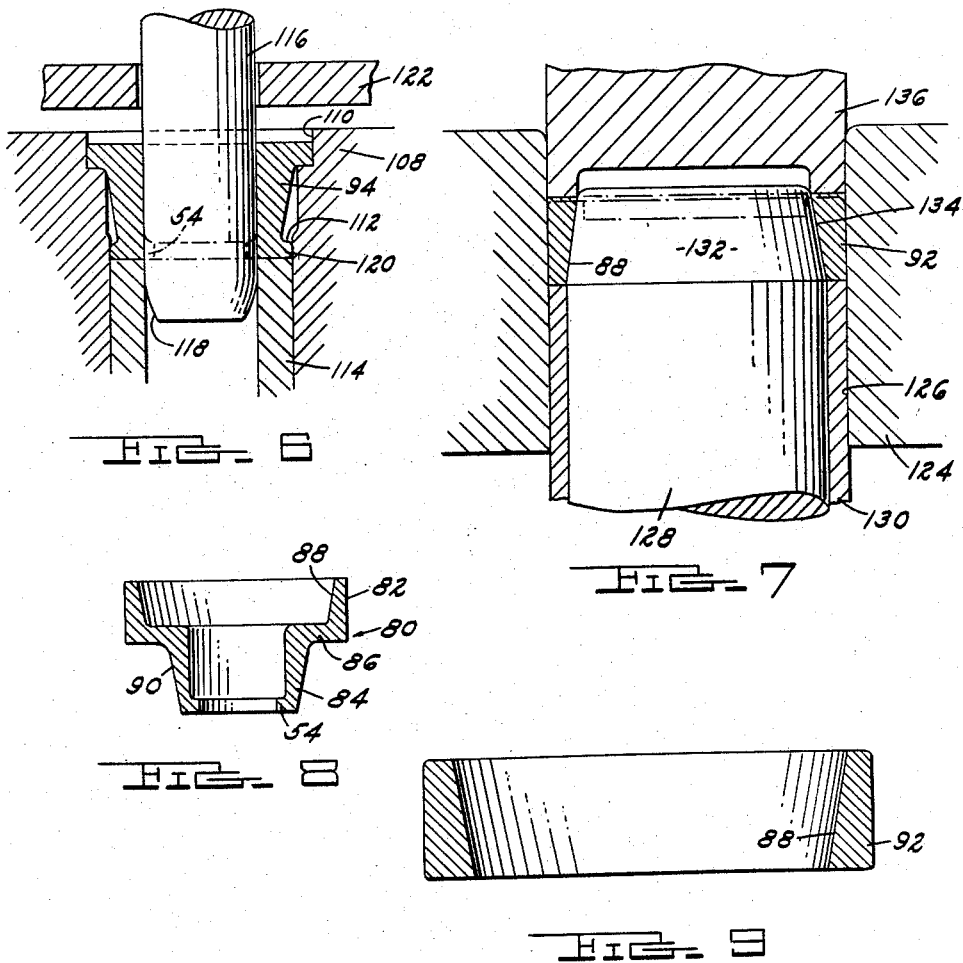
INVENTOR.
JOHN H. BENSON
BY
Barnes, Kisselle, Laughlin & Keisch
ATTORNEYS

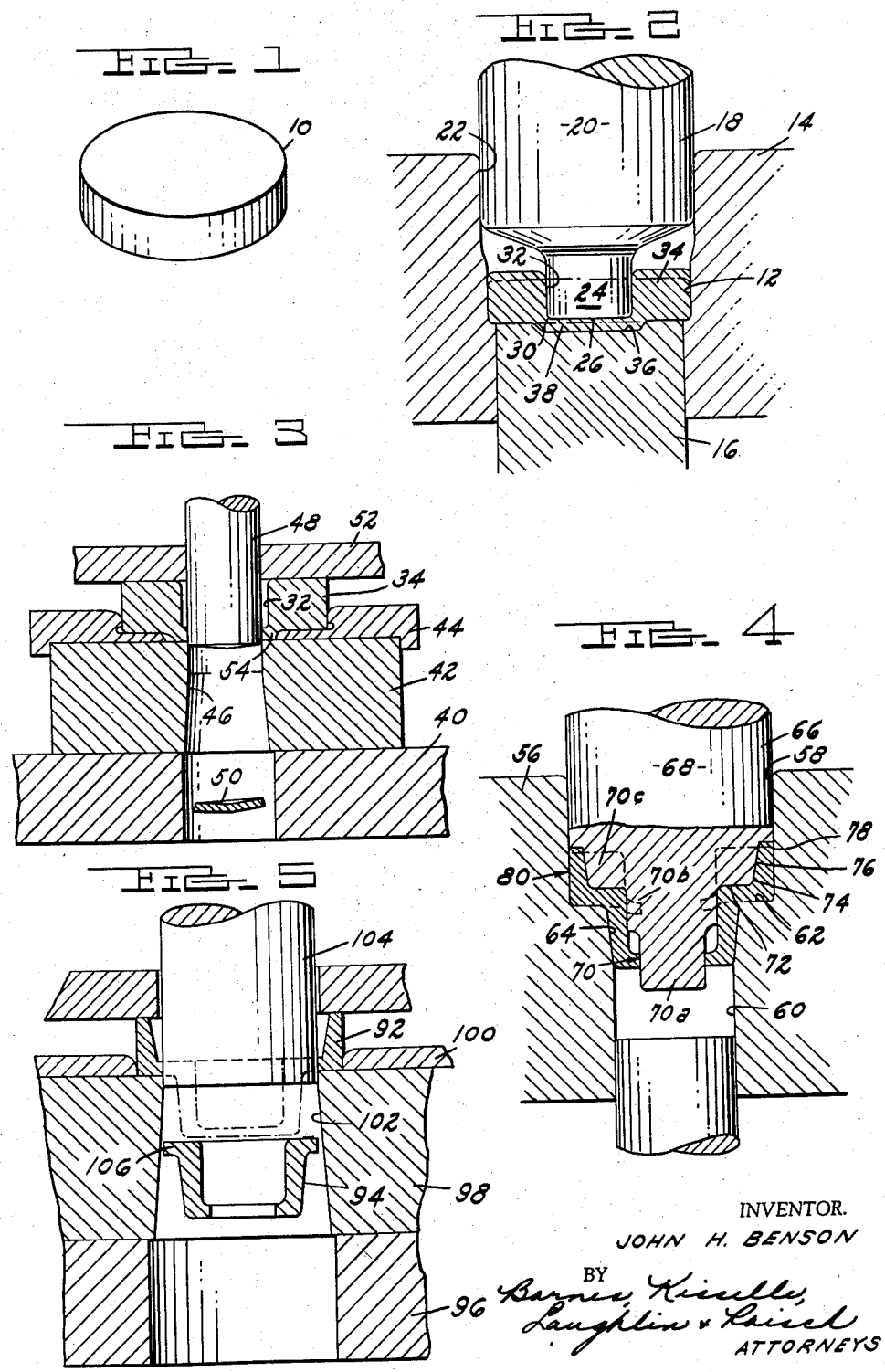

United States Patent Office 2,913,811
Patented Nov. 24, 1959

2,913,811

COLD EXTRUSION OF BEARING RACES

John H. Benson, Salem, Ohio, assignor to American Radiator and Standard Sanitary Corporation, New York, N.Y., a corporation of Delaware Application December 20, 1956, Serial No. 629,658

3 Claims. (Cl. 29—148.4)

This invention relates to cold extrusion and has more particularly to do with the cold extrusion of the inner and outer races of a bearing from a single blank.

It is conventional practice to machine the inner and outer annular races of bearings individually from separate pieces of stock, either solid or tubular. In the case of relatively large bearings, for example, bearings having a diameter of about ten inches, the machining of the races, particularly the inner race, involves a considerable waste of material.

It is an object of the present invention to provide a method and apparatus for forming the inner and outer annular races of a bearing from a single blank by a cold extrusion process which involves a minimum waste of material and a minimum amount of machining.

A further object of the invention resides in the provision of a method of cold forming both the inner and outer races of a bearing in a single set of dies and with only one die required for each race in the final sizing operation.

In the drawings:

Fig. 1 is a perspective view of a metal slug that may be used as the starting blank in forming bearing races in accordance with the present invention.

Figs. 2, 3, 4, 5, 6 and 7 are sectional views showing the apparatus for and the manner in which the successive steps of the method are performed.

Fig. 8 is a sectional view of the tubular work piece formed by the operation illustrated in Fig. 4.

Fig. 9 is a sectional view of the outer bearing race formed in accordance with the present invention.

Fig. 10 is a sectional view of the inner bearing race formed in accordance with the present invention.

The present invention is adapted for forming the inner and outer races of bearings of various types. For the purposes of illustration and not by way of limitation, the drawings illustrate the method of making tapered roller bearing races in accordance with the present invention. The starting blank comprises a solid slug 10 which is preferably cut from bar stock. The faces of slug 10 should be as smooth as possible in order to avoid marks in the races formed therefrom.

In the first operation, slug 10, shown in dotted lines in Fig. 2, is inserted in the cavity 12 of a die 14. A lift-out member 16 cooperates with cavity 12 to form a bottom face therefor. The diameter of cavity 12 just above lift-out member 16 corresponds generally with the diameter of slug 10. Axial downward pressure is applied to the top face of slug 10 by means of a punch 18. Punch 18 has a nose 24 and an enlarged pilot portion 20 having a close fit with the enlarged bore portion 22 of cavity 12. Nose 24, it will be observed, has a diameter substantially less than the diameter of slug 10. The end face 26 of nose 24 is relatively flat and is connected with the side wall portion 28 of the nose by a rounded corner portion 30. The rounded corner portion 30 is fashioned to a configuration described in United States Patent No. 2,748,932, dated June 5, 1956. More specifically, the corner portion 30 of the punch nose 24 is designed so that when the punch is driven downwardly into slug 10, the hole 32 formed in the slug is of slightly greater diameter than the punch nose 24 so that a minimum of friction is encountered between the nose of the punch and the metal of slug 10. Since the slug 10 is confined radially by the die 14 and the lower face thereof is supported on the lift-out member 16, as the punch nose is forced downwardly into slug 10, the metal below the punch nose 24 is caused to flow radially outwardly beneath the flat face 26 of the punch nose and then axially upwardly so that the blank 34 formed thereby is of increased thickness as compared with the slug 10. For a reason which will appear hereinafter, the lift-out member 16 is fashioned with a flat shallow recess 36 which is aligned concentrically with nose 24 but has a diameter slightly greater than that of nose 24. In forming the slug 10 into the blank 34, the annular body portion of blank 34 remains relatively soft since it has not been subjected to severe cold working. However, the thin bottom wall portion 38 of the blank has been rather severely cold worked and is relatively hard.

After the blank 34 is ejected from die 14 as by the lift-out member 16, the bottom wall portion 38 is pierced in the manner shown in Fig. 3. The apparatus for piercing blank 34 is conventional and includes a lower die shoe 40 which supports a die ring 42. A gage ring 44 is in turn supported on die ring 42. Gage ring 44 is arranged to accurately locate blank 34 with respect to the bore 46 of die ring 42 so that when the punch member 48 is driven downwardly through blank 34, a disc 50 is pierced from the bottom wall of the blank. In this arrangement, a stripper plate 52 may be provided for facilitating removal of the punch 48 from the pierced blank. The diameter of punch 48, it will be observed, is less than the diameter of the hole 32 of blank 34. Thus, the pierced blank is provided with a downwardly and radially inwardly extending annular flange 54 which extends circumferentially around the opening 32.

The pierced blank thus formed in accordance with the operation illustrated in Fig. 3 is then in a condition for forward extrusion. The apparatus employed in this forward extrusion step and the manner in which this step is performed is illustrated in Fig. 4. This arrangement includes a die ring 56 provided with a stepped cavity having an upper cylindrical portion 58 and a lower portion 60 connected by a radially inwardly extending shoulder 62. Adjacent shoulder 62, the cavity portion 60 flares inwardly in a direction downwardly with a generally uniform taper as is illustrated at 64. The diameter of upper cavity portion 58 corresponds generally with the diameter of the pierced blank 34 so that the blank seats nicely therein on shoulder 62.

The punch utilized in the forward extrusion operation is designated 66 and includes an enlarged pilot portion 68 that has a close fit with the side wall of the upper cavity portion 58. Punch 66 has a stepped nose 70 of reduced diameter which comprises portions 70a, 70b and 70c of progressively increasing diameter. Nose portion 70c is defined by a tapered side wall 76 and a flat shoulder 72 which connects with nose portion 70b by means of a rounded corner portion 74. The inwardly and downwardly tapering side wall portion 76 connects with the side wall of pilot 68 by means of a radially extending shoulder 78.

Thus, when the punch 66 is driven downwardly into contact with the pierced blank 34, shown in dotted lines in Fig. 4, the nose portion 70b is received within the opening 32 of the pierced blank 34 with the shoulder 72 abutting the top face of the blank and the end portion 70a of the punch nose extending through the opening defined by the flange 54 of the pierced blank 34. The diameter of the side wall portion 76 of the punch is substantially greater than the diameter of nose portion 70*b* but is less than the diameter of the pierced blank 34. Thus, as punch 66 is driven downwardly into pierced blank 34, the shoulder 72 applies axial downward pressure to an inner annular zone of the top face of blank 34 surrounding opening 32. As the punch 66 continues to move downwardly, the metal in blank 34 below shoulder 72 is caused to flow radially inwardly and downwardly through the tapered orifice formed between the side wall of the bore 60 and the side wall of the punch nose 70. An outer annular portion of the metal extrudes upwardly into contact with the shoulder 78 of the blank.

Thus, the operation illustrated in Fig. 4 forms a tubular work piece 80 (Fig. 8) having two axially adjacent portions 82 and 84 that are connected by a shoulder forming flange 86. It will be observed that the inner diameter of the upper enlarged portion 82 of workpiece 80 is larger than the outer diameter of the portion 84 of the work piece. It will also be observed that vertical dimensions of portions 82 and 84 are greater than the thickness of the original starting blank 10. The side wall portion 76 of the punch nose produces an inwardly tapering inner side wall 88, and the tapered cavity 64 of die 56 produces an outer tapered side wall 90 on the smaller portion 84 of work piece 80. The radially inwardly projecting flange 54 is retained.

Thereafter, the work piece 80 is sheared by the apparatus illustrated in Fig. 5 to form an outer bearing race member 92 and an inner bearing race member 94. The apparatus for shearing work piece 80 includes a die shoe 96 that supports a die ring 98 and a gage ring 100 for locating work piece 80 accurately with respect to the bore 102 of the die ring. A shearing punch 104 cooperates with die ring 98 to shear the two members 92 and 94 apart. The diameter of punch 104 is only slightly smaller than the base diameter of tapered wall 88 so that the member 94 is formed with a radially outwardly projecting flange 106 at the upper end thereof.

The two race members 92 and 94 are then sized so as to require a minimum of machining. The inner race 94 is sized in the apparatus shown in Fig. 6. This apparatus includes the die 108 having a cavity provided with an upper portion 110 for sizing flange 106 and a lower portion 112 of smaller diameter for controlling the size of the lower part of race 94 as hereinafter described. Within the bore portion 112, there is arranged an annular lifter 114. A punch 116 is provided with a tapered nose portion 118. When the punch is driven downwardly through the race 94 supported in die 108 as shown, the tapered nose portion 118 engages flange 54 and flows the metal therein radially outwardly to form on the outer race a radially outwardly extending flange 120. The outer diameter of flange 120 is controlled by the side wall of the bore portion 112 of the die. A stripper 122 is employed in conjunction with punch 116 to facilitate removal of the part from the punch. The operation illustrated in Fig. 6 sizes the inner race 94 so that it can be finish machined, heat treated and ground with a minimum of expense.

The outer race 92 is sized by means of the apparatus illustrated in Fig. 7. This apparatus includes a die ring 124 having a cylindrical bore 126. A post 128 projects upwardly into bore 126 and is surrounded by an ejector 130. The upper end of post 128 is fashioned with a nose 132 having an upwardly and inwardly tapering side wall 134. The taper of side wall 134 corresponds to the taper desired on the inner annular face 88 of the outer race. The race member 92 is inserted in bore 126 onto the nose 132 of post 128 and then is struck downwardly by a punch 136. This causes the race member 92 to assume the shape of the cavity defined between nose 132 and die ring 124. Race member 92 is thus accurately sized so that the subsequent machining and grinding operations are reduced to a minimum.

In the case of small bearings, the starting blank, rather than being a solid slug such as shown at 10 in Fig. 1, may be a pierced blank if the slug pierced from the central portion does not represent a considerable waste of metal. Furthermore, in the case of a small bearing wherein the material removed by machining is not extensive in any event, the work piece 80 can be formed without the flange 54; and in place thereof, the lower portion of the inner race can be extruded to a thickness such as to permit machining the flange 120 rather than cold forming this flange.

Thus, it will be seen that I have provided a method for forming the inner and outer annular races of bearings in a manner which is conducive to economy both from the standpoint of material utilized and machining required to produce the finished races. The method herein described is particularly desirable in connection with the forming of races for tapered roller bearings since the tapered surfaces required on the two races can be accurately cold formed to substantially the required size and the flanges required on the races between which the bearings are retained can also be cold formed. In addition, it will be noted that the two races can be formed as a single work piece in a single set of dies and thereafter sheared into separate inner and outer races. This represents a considerable saving in die costs in comparison with procedures in which the inner and outer races are individually formed.

I claim:

1. The method of making the inner and outer annular races of a bearing from a single circular blank having a diameter corresponding generally to the outer diameter of the outer race and having a thickness less than said races which comprises supporting the blank against substantial radial outward expansion and around an outer annular zone on its bottom face while applying an axial downward force flatwise to the top face of the blank over a central area of less diameter than the inner diameter of said outer annular zone, continuing the application of said axial downward force to a location where the locus of application of said force lies in a plane spaced above and adjacent the bottom supported face portion of the blank and at the same time, supporting the bottom central area of the blank in a plane spaced below the plane of said supported bottom face portion of the blank, then piercing the downwardly displaced central bottom portion of the blank, supporting the pierced blank on its bottom face around an outer annular zone having an inner diameter greater than the inner diameter of the first mentioned annular zone and simultaneously applying an axial downward force flatwise to the top face of the blank over a central area having a diameter greater than the diameter of said first mentioned central area and greater than the inner diameter of said second mentioned annular zone while preventing the metal of the blank from expanding radially outwardly and supporting the side wall of the hole formed in the blank by the application of said first mentioned force against radial inward collapse, continuing the application of said last mentioned force to a location where the locus of application thereof is spaced slightly above the plane of said supported bottom face portion of the blank and by said force, forming a tubular member having two concentric portions, one portion having a greater inner diameter than the outer diameter of the other portion and connected thereto by a generally radially extending flange, shearing said tubular member axially at said flange to separate said two portions from one another into two annular members, the steps thus far recited being performed while the blank is at room temperature, and then forming the two annular members into said inner and outer races.

2. The method called for in claim 1 wherein the metal in the outer annular portion of the blank is permitted to flow axially in an upward direction during the application of said two downward forces.

3. The method called for in claim 1 wherein said piercing step provides an aperture in the blank having a diameter less than the hole produced in the blank by the application of said first mentioned force and said step of axially shearing the tubular member provides the smaller of said two annular members with a radially outwardly extending flange at the end thereof opposite said aperture and the metal around said aperture is displaced radially outwardly to form a radially outwardly extending flange around the previously apertured end of the smaller diameter member.

References Cited in the file of this patent

UNITED STATES PATENTS

| | | |
|---|---|---|
| 1,124,359 | Taylor | Jan. 12, 1915 |
| 1,387,638 | Bingham | Aug. 16, 1921 |
| 2,203,125 | Beauchamp | June 4, 1940 |
| 2,613,429 | Dierbeck | Oct. 14, 1952 |
| 2,755,543 | Dunn | July 24, 1956 |
| 2,766,512 | Hatebur | Oct. 16, 1956 |

FOREIGN PATENTS

| | | |
|---|---|---|
| 330,840 | Great Britain | June 19, 1930 |